United States Patent Office 3,705,136
Patented Dec. 5, 1972

3,705,136
POLYMERIC ACRYLIC COMPOUNDS OF POLYCYCLIC HYDROCARBONS AND PROCESSES FOR PREPARING SAME
John Duval Cawley, Rochester, and Jan Willem Hendrik Faber, Hilton, N.Y., assignors to Eastman Kodak Company, Rochester, N.Y.
No Drawing. Filed Nov. 28, 1969, Ser. No. 880,894
Int. Cl. C08f 3/64, 3/66, 7/02
U.S. Cl. 260—79.7
6 Claims

ABSTRACT OF THE DISCLOSURE

Acrylic compounds are disclosed which comprise either thio-substituted polycyclic groups or polycyclic groups comprising at least 4 carbocyclic rings which can optionally be thio-substituted. In one embodiment, polymers can be prepared from the above acrylic compounds.

---

This invention relates to acrylic compounds, polymerized acrylic compounds and processes for preparing said compounds. The acrylic compounds of this invention comprise either thio-substituted polycyclic groups or polycyclic groups comprising at least 4 carbocyclic rings which can optionally be thio-substituted.

It is known that polyacrylic resins can be used to form moldable materials which display useful optical properties. Optically clear lenses have been molded from acrylic polymers such as methyl methacrylate, styrene, o-chlorostyrene, acrylonitrile and the like. In general, lens articles produced from aliphatic or alicyclic polymers have high dispersion values ($v$) and low refractive indices ($n_D^{20}$), while polymers containing aromatic side chains have high refractive indices and low dispersion values. However, an easily molded lens composition having a high refractive index as well as a high dispersion value is a desirable optical component, which can be particularly useful in a compound lens system requiring an $f$-number of less than about 8.

We have now discovered a class of polymeric compounds having good optical properties and other desirable properties, such as high scratch hardness, high glass transition temperature, extrudability, dimensional stability, solubility, etc., necessary to permit their use in extrudable and moldable articles.

The practice of our invention results in a new class of acrylic compounds which display a variety of uses as moldable materials, fibers, films, laminates, polymeric coatings and the like. Compounds of the invention are particularly useful as lens compositions having ($n_D^{20}$) of at least 1.50 and dispersion values ($v$) from about 50 to about 60 when $v$ is defined as $$v = \frac{n_D - 1}{n_F - n_C}$$

where $n_D$=sodium D line, $n_F$=hydrogen F line and $n_C$=hydrogen C line.

In a general embodiment, the invention relates to acrylic monomers and polymeric compounds comprising units of said monomers wherein said acrylic monomers comprise the group:

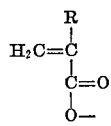

wherein R is hydrogen or alkyl, and preferably a hydrogen or methyl group, wherein said compound has appended thereto an alkyl thio-substituted polycyclic group or a polycyclic group containing at least two bridged rings, preferably fused together. When the appended group contains less than two bridged rings, substituted thio groups are necessary to provide the required index of refraction and dispersion values.

A typical embodiment of this invention relates to monomers which are esters of acrylic acid or methacrylic acid and an hydroxy group-containing Diels-Alder adduct of cyclopentadiene or of cyclopentadiene and an $\alpha,\beta$-ethylenically unsaturated alkene dienophile such as allyl alcohol, crotyl alcohol, vinyl acetate and the like. More specifically, the preferred novel monomers are acrylate and methacrylate esters containing the condensation residue of an hydroxy group-containing Diels-Alder adduct of 2 to 4 moles of a cyclopentadiene and, optionally, 1 mole of a second $\alpha,\beta$-ethylenically unsaturated alkene dienophile, or an hydroxy group-containing Diels-Alder adduct of 1 mole of cyclopentadiene and 1 mole of an $\alpha,\beta$-ethylenically unsaturated alkene dienophile, said adducts being substituted with an alkylthio group at least when derived from less than 2 moles of cyclopentadiene.

Classical, the Diels-Alder reaction involves the addition of a dienophile to a diene. It is well-known that cyclopentadiene, as well as many $\alpha,\beta$-ethylenically unsaturated alkenes, is a dienophile and, further, that Diels-Alder adducts of cyclopentadiene also are dienophiles and will continue to react with cyclopentadiene to form higher adducts. Such reactions are generally performed at high temperature in a high-pressure autoclave. The resulting reaction product is often a mixture of adducts which can be isolated by fractionation. The unsaturated adducts obtained can then be hydrogenated to obtain cycloalkanes; however, we have discovered that the optical properties of these adducts are often improved when alkyl mercaptans are added to the unsaturated adducts to obtain alkylthio-substituted adducts, especially when high index of refraction and dispersion values are desired.

The adducts employed as starting materials in preparing certain preferred acrylate and methacrylate esters of this invention necessarily must contain an hydroxyl group or an acylated hydroxyl group, e.g., formyl, acetyl, etc., in order to condense or participate in an ester interchange reaction with the acrylic and methacrylic acids or their esters. Provision of such groups has been accomplished in several ways. In one embodiment, acetic acid is employed in the preparation of the Diels-Alder adducts to provide acetoxy-substituted adducts. Alternatively, an hydroxy or acyloxy group-containing dienophile, such as allyl alcohol, vinyl acetate and crotyl alcohol, has been employed in preparing the adducts. In yet another embodiment, an hydroxy-substituted alkyl mercaptan is added to the unsaturated adducts to obtain hydroxyalkylthio-substituted adducts.

In a preferred embodiment of this invention, the monomers have the structure:

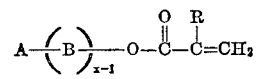

wherein $x$ is 1 or 2; —B— is (—CH$_2$—) or ($-$S—R$^1$)$-$ wherein —R$^1$— is a lower alkylene group; R is hydrogen or methyl; and A— is a polycyclic moiety and is preferably derived from a Diels-Alder adduct of 2 to 4 moles of a cyclopentadiene, or of 1 to 4 moles of a cyclopentadiene and 1 mole of an $\alpha,\beta$-ethylenically unsaturated dienophile selected from crotyl alcohol, allyl alcohol and vinyl acetate, said adducts containing therein an alkylthio group when derived from less than 2 moles of cyclopentadiene.

In another preferred embodiment, the monomers of this invention can be represented by the formula:

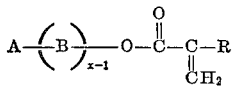

wherein —B—, R and $x$ are as represented above, and A is a polycyclic group containing either (1) a thio-substituted polycyclic group such as a [2.2.1] bicyclic group or a [3.2.2.1] tricyclic group as represented, for example, by the formulae:

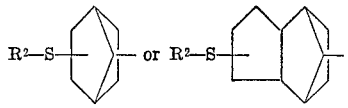

wherein $R^2$ is an alkyl group including substituted alkyl groups, or (2) A can be a polycyclic group containing at least two bridged-ring groups which are preferably fused together and can optionally be thio-substituted. The bridged-ring groups (2 above) are preferably polycyclic groups which can be represented by the formulae:

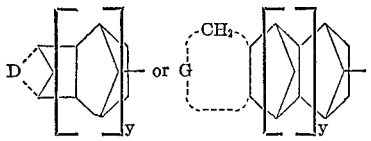

wherein $y$ is a positive integer of 1 or greater and is preferably from 1–3; D can be a vinylene group, a chloroethylene group, alkylthio-substituted ethylene and the like; and G can be vinylene, ethylene, alkylthio-substituted ethylene and the like.

In another embodiment, acrylic monomers are prepared by reacting mercaptans such as alkyl mercaptans, e.g., methyl mercaptan, ethyl mercaptan and the like, with hydroxyl-substituted norbornenes to form norbornyl sulfides which can then be esterified directly with acrylic or methacrylic acid to yield an acrylate or methacrylate ester monomer.

In another embodiment, a polycyclic alcohol, formate or acetate containing at least 2 or 3 cyclic carbon moieties including 1 bridged ring or said polycyclic compound containing at least 4 carbocyclic rings including at least 1 bridged ring is reacted with an alkyl acrylate or methacrylate.

In another embodiment, perhydro-4,11:5,10:6,9-trimethanocyclopent[b]anthr-7(8)yl acetate is reacted with methyl methacrylate.

It is understood that the number of rings in the polycyclic moieties are counted as the lowest number of rings which will describe the moiety, i.e., a [2.2.1] ring structure is a bicyclic moiety, a [3.2.2.1] ring structure is a tricyclic moiety, etc.

Acrylic monomers which are useful in the practice of the invention include those compounds corresponding to the general formula disclosed hereinabove wherein A comprises a bridged ring such as, for example, bicyclo[2.2.1]-heptane. Typical bridged-ring structures include those which are substituted with alkylthio groups having the structure $R^2$—S— wherein $R^2$ is as described above, and optionally substituted with 1 or 2 hydroxy groups. Suitable examples of alkyl groups include methyl, hydroxymethyl, ethyl, β-hydroxyethyl, propyl, 3-hydroxypropyl-2,3-dihydroxypropyl and the like.

Acrylic compounds containing at least 2 bridged rings can be substituted with alkylthio groups or halogen groups such as, for example, chloride, bromide, etc., though alkylthio groups are preferred.

Examples of typical acrylic monomers prepared according to this invention include:

(1) 5(6)-n-propylmercapto-2-norbornylmethyl methacrylate
(2) 5(6)-methylmercapto-2-norbornylmethyl methacrylate
(3) 5(6)-(2,3-dihydroxypropyl)mercapto-2-norbornylmethyl methacrylate
(4) 6(7)-chloro-1,4:5,8-dimethanoperhydronaphth-2-yl methacrylate
(5) 1,2,3,4,4a,5,8,8a-octahydro-1,4:5,8-dimethano-2-naphthyl methacrylate
(6) 3a,4,4a,5,6,7,8,8a,9,9a-decahydro-4,9:5,8-dimethano-1H-benz[f]inden-6(7)yl methacrylate
(7) 3a,4,4a,5,5a,6,7,8,9,9a,10,10a,11,11a-tetradecahydro-4,11:5,10:6,9-trimethano-1H-cyclopent[b]-anthr-7(8)yl methacrylate
(8) 3a,4,4a,5,6,7,8,8a,9,9a-decahydro-4,9:5,8-dimethanobenz[f]indan-6(7)yl methacrylate
(9) perhydro-4,11:5,10:6,9-trimethanocyclopent[b]-anthr-7(8)yl methacrylate
(10) 5(6)-methylmercapto-2-norbornyl methacrylate
(11) 2(3)methylmercapto-4,7-methanoperhydroindan-6(7)-yl methacrylate
(12) 5(6)-methacryloyloxyethylmercapto-4,7-methano-2-methylmercaptoperhydroindan
(13) 2-methacryloyloxyethylmercapto-4,7-methano-5(6)-methylmercaptoperhydroindan
(14) 6(7)-methylmercapto-1,4:5,8-dimethanoperhydronaphth-2-yl methacrylate
(15) 2(3) methylmercapto-4,9:5,8-dimethanoperhydrobenz[f]indan-6(7)-yl methacrylate
(16) 5(6)-methylmercapto-3-methylnorborn-2-ylmethyl methacrylate The acrylic compounds of the invention can be prepared by various methods. In one method, mercaptans are added to a norbornene ring to form norbornyl sulfides. Norbornyl sulfides containing an hydroxyl group are esterified directly with acrylic acid to yield an acrylate ester. The ester monomer can then be polymerized by heating it in the preesnce of a catalyst such as, for example, azobis(isobutyronitrile) and the like. Polymerization can also be achieved by irradiating ester monomers with ultraviolet light. Optionally, bead polymerizations in which a mixture of monomer, catalyst and water containing polyvinyl alcohol is stirred under nitrogen can be used to prepare the compounds of the invention.

In an ester interchange method, an alcohol comprising at least 1 bridged carbon ring is refluxed with an alkyl acrylate or methacrylate. The resulting monomers are polymerized according to the methods described above.

In another method, ester-ester interchange products which are polymerizable are formed by the reaction between a formate or acetate of an alcohol comprising at least one bridged carbon ring and an alkyl- or alkylthio-acrylate or -methacrylate.

The glass transition temperatures as calculated herein can be calculated by differential thermal analysis as disclosed in "Techniques and Methods of Polymer Evaluation," vol. 7, Marcel Dekker, Inc., New York, 1966.

This invention is further illustrated by the following examples.

PREPARATION OF ACRYLIC COMPOUNDS

Example 1.—Poly[6(7)-chloro-1,4:5,9-dimethanoperhydronaphth-2-yl methacrylate]

Dry hydrogen chloride is passed into a refluxing methanol solution of 1,2,3,4,4a,5,8,8a-octahydro-1,4:5,8-dimethano-2naphthyl acetate until reaction is complete. The resulting alcohol, i.e., 6(7)-chloro-1,2,3,4,4a,5,6,7,8,8a-decahydro-1,4:5,8-dimethano-2 naphthol is esterified directly by reacting it with methacrylic acid. The monomer product is polymerized thermally. The $n_D^{20}=1.5470$ and $v=61$.

Example 2.—Poly[perhydro-4,11:5,10:6,9-trimethanocyclopent[b]anthr-7(8)-yl methacrylate]

Dicyclopentadiene (1390 g., 10.5 moles) and acetic acid (420 g., 7.0 moles) are heated in an autoclave at 200° C. for 18 hours. The product is hydrogenated in ethanol with Raney nickel at 60 p.s.i. and 50° C. This reaction product is distilled at 5 mm. of mercury until the pot temperature reaches 230° C. and distilling ends. The residue is further disttilled at 3μ of mercury to give perhydro - 4,11:5,10:6,9 - trimethanocyclopent[b]anthr-7(8)-yl acetate which is a nearly colorless wax.

This product is esterified by the ester-ester interchange method using methyl methacrylate to yield perhydro-4, 11:5,10:6,9 - trimethanocyclopent[b]anthr-7(8)-yl methacrylate. The product is purified by passing it in a benzene solution through columns of activated magnesium silicate and sodium aluminium silicate ion exchange mineral to yield a yellow wax. The yellow wax is polymerized by holding its solution in 4 ml. per gram of benzene containing 0.5 percent by weight of the monomer of 2,2'-azobis (2-methylpropionitrile) at 65° C. for 6 days. The resultant polymer is then precipitated in methanol.

$n_D^{20} = 1.5550$; $v = 55$

Example 3.—Poly[5(6)-methacryloyloxyethylmercapto-4,7-methano-2-methylmercaptoperhydroindan]

(A) Preparation of 3a,4,5,6,7,7a-hexahydro-4,7-methano - 5-(2-hydroxyethylmercapto)indene.—A mixture of 78 grams (1.0 mole) of 2-mercaptoethanol, 132 grams (1.0 mole) of dicyclopentadiene, 420 ml. of benzene and 0.0164 gram (.001 mole) of 2,2' - azobis(2-methylpropionitrile) is heated slowly to boiling, refluxed for 2 hours and concentrated to a yellow oil. The oil is distilled through a 12" Vigreux column to yield 170 grams (81.0%) of product boiling at 147–150° C./2.2 mm. Hg.

Analysis.—Calcd. for $C_{12}H_{18}OS$ (percent): C, 68.6; H, 8.6. Found (percent): C, 68.3; H, 8.4.

(B) Preparation of 5(6) - (2-hydroxyethylmercapto)-4,7 - methano - 2 - methylmercaptoperhydroindan.—The above product (157.5 grams, 0.75 mole) is reacted with 48 grams (1.0 mole) of methylmercaptan in the presence of 1.23 grams (.0075 mole) of 2,2'-azobis(2-methylpropionitrile) in a flask equipped with a Dry Ice condenser. The reaction mixture is irradiated with a sun lamp for 5½ hours. The residue in the flask is degassed under a water-pump aspirator and the product is distilled through a 10-inch Vigreux column. The product (174 grams, 90.6%) is collected at 147–165° C./0.3 mm. Hg.

Analysis.—Calcd. for $C_{13}H_{22}OS_2$ (percent): C, 60.5; H, 8.6. Found (percent): C, 60.5; H, 8.6.

(C) Preparation of 5(6)-methacryloyloxyethylmercapto - 4,7 - methano - 2-methylmercaptoperhydroindan.—A mixture of 116 grams (0.45 mole) of the product formed above, 90 grams (0.90 mole) of methyl methacrylate, 147 ml. of N,N-dimethylformamide, 7.4 grams of hydroquinone and 1.22 grams (0.0225 mole) of sodium methoxide is placed in a flask fitted with a vertical condenser with water at 70° C. circulating in the jacket attached at the top to a downward cold condenser. The mixture is refluxed for 2½ hours, concentrated, dissolved in diethyl ether and washed with water. The residue is further washed with dilute hydrochloric acid, with a 5% sodium hydroxide solution and with water before being concentrated. The oil is diluted with 140 ml. of ligroine and the product is separated in a 3.6 x 60 cm. chromatographic column containing an activated magnesium silicate. After treatment with 1.2 grams of activated carbon, the mixture is again concentrated on a rotary evaporator and the residue is distilled at 120–125° C./2μ Hg.

Analysis.—Calcd. for $C_{17}H_{26}O_2S_2$ (percent): C, 62.6; H, 8.0. Found (percent): C, 62.7; H, 8.0.

(D) Polymerization of the above distilled compound is achieved by sealing 15 ml. of distillate monomer under nitrogen in a glass ampul and irradiating for 17 hours with a GE sun lamp.

Example 4.—Poly(2-methacryloyloxyethylmercapto-4,7-methano-5(6)-methylmercaptoperhydroindan)

(A) Preparation of 3a,4,5,6,7,7a-hexahydro-4,7-methano-5-methylmercaptoindene.—A mixture held at −25° C. of 264 grams (2.0 moles) of dicyclopentadiene, 100 grams (2.08 moles) of methylmercaptan and 6.56 grams (0.04 mole) of 2,2'-azobis(2-methylpropionitrile) is placed in a flask equipped with a Dry Ice condenser and then warmed and irradiated with a sun lamp for 1 hour. The residue is degassed under a water-pump aspirator and distilled. The product (301 grams, 83.6%) boils at 120–121° C./ 10 mm. Hg.

Analysis.—Calcd. for $C_{11}H_{16}S$ (percent): C, 73.3; H, 9.0. Found (percent): C, 73.5; H, 9.1.

(B) Preparation of 2 - (2-hydroxyethylmercapto-4,7-methano - 5(6)-methylmercaptoperhydroindan.—A mixture of 119 grams (0.66 mole) of the product prepared above, 65 grams (0.83 mole) of 2-mercaptoethanol and 1.08 grams (0.0066 mole) of 2,2'-azobis-(2-methylpropionitrile) is placed in a flask and irradiated at a distance of 20 cm. with a sun lamp for 31 hours. The reaction mixture is distilled through a 12-inch Vigreux column. The collected distillate boils at 166–170° C./0.5 mm. Hg.

Analysis.—Calcd. for $C_{13}H_{22}OS_2$ (percent): C, 60.5; H, 8.6. Found (percent): C, 60.6; H, 9.0.

(C) Preparation and polymerization of 2 - methacryloyloxyethylmercapto - 4,7 - methano - 5(6) - methylmercaptoperhydroindan.—The compound prepared above (142 grams, 0.55 mole) is converted to a methacrylate monomer by the procedure described in paragraph (C) in Example 3 to yield 125 grams (69.8%) of product.

Analysis.—Calcd. for $C_{17}H_{26}O_2S_2$ (percent): C, 62.6; H, 8.0. Found (percent): C, 63.0; H, 8.1.

This product is polymerized according to the procedure described in paragraph (D) in Example 3. $n_D^{20} = 1.5787$, $v = 53$.

Example 5.—Poly[6(7) - methylmercapto - 1,4:5,8-dimethanoperhydronaphth-2-yl methacrylate]

(A) Preparation of 1,2,3,4,4a,5,6,7,8,8a - decahydro-1, 4:5,8 - dimethano - 6(7)-methylmercapto-2-naphthol.— A mixture of 79 grams (0.45 mole) of 1,4:5,8-dimethano - 1,2,3,4,4a,5,8,8a - octahydro - 2 - naphthol and 54 grams (1.12 moles) of methylmercaptan is reacted in the presence of 2,2'-azobis(2-methylpropionitrile) (0.74 gram, 0.0045 mole) according to the procedure described in paragraph (B) in Example 3. The crude reaction mixture is concentrated in a rotary evaporator to yield 99 grams of product.

(B) Preparation and polymerization of 1,2,3,4,4a,5,6, 7,8,8a - decahydro - 1,4:5,8-dimethano-6(7)-methylmercaptonaphth-2-yl methacrylate.—The crude product (94 grams, 0.42 mole) is further reacted according to the procedure described in paragraph (C) in Example 3 to yield 82.7 grams of 6(7) - methylmercapto - 1,4:5,8-dimethanoperhydronaphth-2-yl methacrylate.

The desired polymer is prepared from 15 ml. of the above monomer by the procedure given in paragraph (D) of Example 3. The polymer has the following properties: $n_D^{20} = 1.5562$; $v = 57 \pm 2$; $Tg = 61°$ C.

Example 6.—Poly(5(6)-methylmercapto-3-methylnorborn-2-ylmethyl methacrylate)

(A) Preparation of 3-methyl-5(6)-methylmercapto-2-norbornanemethanol.—A mixture of 414 grams (3.0 moles) of 2-hydroxymethyl-3-methyl-5-norbornene and 0.49 gram (0.003 mole) of 2,2'-azobis-(2-methylpropionitrile) is placed in a 3-necked flask fitted with a reflux condenser having a side arm connected to a Dry Ice trap, a sealed stirrer, a thermometer and a gas inlet tube. Methylmercaptan is bubbled into a mixture which is illuminated by a GE sun lamp and stirred continuously. The temperature is held at 50–55° C. by regulating the flow of methylmercaptan and the distance of the sun lamp from the flask. Irradiation is applied until the reaction subsides and about 15 minutes longer. The mixture is degassed by heating under vacuum and it is then distilled to yield 504 grams (90.3%) of product collected at 138–141° C./5 mm. Hg.

(B) Preparation of 2-methacryloyloxymethyl-3-methyl-5(6)-methylmercaptonorbornane.—A mixture of 465 grams (2.5 moles) of the product formed above, 375 grams (3.75 moles) of methyl methacrylate, 635 ml. of N,N-dimethylformamide, 31.7 grams of hydroquinone and 6.8 grams (0.125 mole) of sodium methoxide is placed in a flask and reacted according to the procedure described in paragraph (C) of Example 3. The product (345 grams) distills at 85° C./2μ.

The desired polymer is prepared from 15 ml. of the above monomer by the procedure given in paragraph (D) in Example 3. The polymer has the following properties: $n_D^{20}=1.5400$; $v=56$.

PROPERTIES OF ACRYLIC COMPOUNDS

Example 7

Indices of refraction ($n_D^{20}$) and dispersion values ($v$) of acrylic compounds of the invention having high glass transition temperatures are set forth in the table below. Physical and optical properties of the disclosed compounds indicate that they are suitable for moldable materials and that they are particularly useful as new lens compositions.

TABLE

| No. | Compound | $n_D^{20}$ | $v$ |
|---|---|---|---|
| 1 | CH$_3$CH$_2$CH$_2$S–[norbornane]–CH$_2$–O–C(=O)–C(CH$_3$)(CH$_2$)–]$_n$ | 1.5402 | 53.5 |
| 2 | CH$_3$–S–[norbornane]–CH$_2$–O–C(=O)–C(CH$_3$)(CH$_2$)–]$_n$ | 1.5505 | 55.1 |
| 3 | HO–CH$_2$CHCH$_2$S(OH)–[norbornane]–CH$_2$–O–C(=O)–C(CH$_3$)(CH$_2$)–]$_n$ | 1.5571 | 48.5 |
| 4 | Cl–[bicyclic]–O–C(=O)–C(CH$_3$)(CH$_2$)–]$_n$ | 1.5470 | 61 |
| 5 | [bicyclic]–O–C(=O)–C(CH$_3$)(CH$_2$)–]$_n$ | 1.5410 | 56 |
| 6 | [bicyclic with unsaturation]–O–C(=O)–C(CH$_3$)(CH$_2$)–]$_n$ | 1.5527 | 56.5 |
| 7 | [tricyclic]–O–C(=O)–C(CH$_3$)(CH$_2$)–]$_n$ | 1.5600 | 43 |
| 8 | [tricyclic]–O–C(=O)–C(CH$_3$)(CH$_2$)–]$_n$ | 1.5534 | 55.3 |
| 9 | [tricyclic]–O–C(=O)–C(CH$_3$)(CH$_2$)–]$_n$ | 1.5550 | 55 |
| 10 | CH$_3$S–[bicyclic]–O–C(=O)–C(CH$_3$)(CH$_2$)–]$_n$ | a 1.5470 / b 1.5445 | 50 / 52 |

TABLE—Continued

| No. | Compound | $n_D^{20}$ | $v$ |
|---|---|---|---|
| 11 | CH₃S—[structure]—O—C(=O)—C(CH₃)(CH₂)—]ₙ | 1.5540 | 54 |
| 12 | CH₃S—[structure]—SCH₂CH₂O—C(=O)—C(CH₃)(CH₂)—]ₙ | 1.5800 | 50 |
| 13 | CH₃S—[structure]—SCH₂CH₂—O—C(=O)—C(CH₃)(CH₂)—]ₙ | 1.5787 | 53 |
| 14 | CH₃S—[structure]—O—C(=O)—C(CH₃)(CH₂)—]ₙ | 1.5562 | 57 |
| 15 | CH₃S—[structure]—O—C(=O)—C(CH₃)(CH₂)—]ₙ | 1.5663 | 56 |
| 16 | CH₃S—[structure]—CH₂O—C(=O)—C(CH₃)(CH₂)—]ₙ, —CH₃ | 1.5400 | 56 |

ᵃ Exo-isomer.   ᵇ Endo-isomer.

Example 8

(A) *Preparation of exo-5-norbornen-2-yl acetate.*—A mixture of 300 grams (286 ml., 5.0 moles) of acetic acid and 690 grams (758 ml., 7.5 moles) of 2,5-norbornadiene is rocked and heated at 190° C. for 22 hours in a high-pressure autoclave. The mixture is removed and distilled through a 14-inch Vigreux column under vacuum. The product (498 grams, 65.5 percent) is collected at 73–76° C. at 14 mm. of Hg pressure.

(B) *Preparation of exo-5(6)-methylmercapto-exo-2-norbonyl methacrylate.*—Exo-5-norbornen-2-yl acetate (52.7 grams, 0.347 mole), methylmercaptan (25 grams, 0.52 mole) and 2,2′-azobis(2-methylpropionitrile) (0.85 gram, 0.0052 mole) are mixed at −25° C. in a flask equipped with a Dry Ice condenser and then warmed and irradiated with a sun lamp. An exothermic reaction begins at once and is controlled by cooling in an ice-salt bath. In 10 minutes the reaction subsides and irradiation is continued for 30 minutes.

The residue is degassed under a water-pump aspirator and then saponified with methanolic potassium hydroxide by heating 18 hours in 190 ml. of methanol containing 34.3 grams of 85 percent potassium hydroxide (about 29.2 grams, 0.52 mole). The methanol is removed by evaporation and the mixture extracted with diethyl ether. The ether extracts are concentrated and then distilled through a 10-inch Vigreux column to collect 45.2 grams (82.5 percent) of the colorless oil, exo-5(6)-methylmercapto-exo-2-hydroxynorbornane, boiling at 135–139° C./11 mm. Hg.

*Analysis.*—Calcd. for $C_8H_{14}OS$ (percent): C, 60.7; H, 8.9. Found (percent): C, 61.0; H, 9.0.

In a flask fitted with a Dean-Stark apparatus is placed 44.0 grams (0.278 mole) of the exo-5(6)-methylmercapto-exo-2-hydroxynorbornane prepared above, 47.8 grams (0.556 mole) of methacrylic acid, 3.1 grams of hydroquinone, 240 ml. of benzene and 1.53 grams (1.15 ml., 0.0139 mole) of ethanesulfonic acid. The mixture is refluxed for about 24 hours and cooled. After addition of water, the mixture is extracted with diethyl ether, the extracts washed first with 2 percent sodium hydroxide solution, then with water, and dried. To the extracts are added 0.63 gram of hydroquinone and 0.63 gram of Aranox, a polymerization inhibitor sold by U.S. Rubber Co. The mixture is then distilled through a 10-inch Vigreux column. The product (52.0 grams, 82.8 percent) is collected at 117–122° C./11.5 mm. Hg.

*Analysis.*—Calcd. for $C_{12}H_{18}O_2S$ (percent): C, 63.8; H, 8.0. Found (percent): C, 63.7; H, 8.3.

(C) *Polymerization of exo-5(6)-methylmercapto-exo-2-norbornyl methacrylate.*—Fifteen ml. of the compound prepared in Example 8(B) are sealed under nitrogen in a glass ampul and irradiated for about 17 hours with a sun lamp. The liquid becomes rigid after 15 minutes. The ampul is opened and the polymer removed. It has a refractive index $n_D^{20}$=1.5470 and a dispersion $v$=50.

Example 9.—Polymerization of exo-5(6)-methylmercapto-endo-2-norbornyl methacrylate Poly(exo - 5(6) - methylmercapto-endo - 2 - norbornyl methacrylate) is prepared stepwise by the procedures of Example 8 except that the endo isomer, endo-5-norbornen-2-yl acetate, is used as the starting material in place of the exo isomer. The endo isomer is obtained from the reaction of vinyl acetate and dicyclopentadiene in the presence of hydroquinone at 180° C. in a high-pressure autoclave for 10 hours.

The polymer has the following physical properties: $n_D^{20}$=1.5445; $v$=52; $T_g$=76° C.

Example 10–A.—Preparation of 5(6)-acetoxy-3,4,5,6,7, 7a-hexahydro-4,7-methanoindene (A) and 6(7)-acetoxy-3a,4,4a,5,6,7,8,8a,9,9a - decahydro-4,9:5,8-dimethano-1H-benz[f]indene (B)

A high-pressure autoclave is charged with 132 grams (1 mole) of dicyclopentadiene and 75 grams (1.25 moles) of acetic acid and shaken at 180° C. for 12 hours. The crude mixture is dissolved in 500 ml. of diethyl ether, washed with 200 ml. of water, filtered, washed again in water, then with dilute ammonium hydroxide until alkaline, concentrated, and fractionated through a 10-inch Vigreux column to provide 43.8 grams (30.3 percent) of the acetoxydicyclopentadiene (A) boiling at 103–125° C./5 mm. Hg and 53.2 grams (36.8 percent) of the acetoxytricyclopentadiene (B) boiling at 165–183° C./5 mm. Hg.

Example 10–B.—Preparation and polymerization of 2-methylmercapto-4,7-methanoperhydroindan - 5(6) - yl methacrylate The acetoxydicyclopentadiene (A) prepared in Example 10–A above (66.7 grams, 0.347 mole) is converted stepwise by the procedure of Example 8B to the methylmercapto derivative by reaction with methylmercaptan, to the alcohol by saponification, and finally to the methacrylate by direct esterification. Yield=46.0 grams.

*Analysis.*—Calcd. for $C_{15}H_{22}O_2S$ (percent): C, 67.7; H, 8.3. Found (percent): C, 68.0; H, 7.9.

The methacrylate derivative (15 ml.) is polymerized in a sealed ampul as described in Example 8C. The polymer has the following physical properties: $n_D^{20}=1.5540$; $v=54$; Tg=92° C.

Example 11.—Preparation of poly(2-methylmercapto-4,9:5,8-dimethanoperhydrobenz[f]indan-6(7)-yl methacrylate This polymer is prepared by the procedure of Example 10–B, except that the acetoxytricyclopentadiene (B) obtained in Example 10–A is used as the starting material rather than the acetoxydicyclopentadiene (A). The polymer has the following properties: $n_D^{20}=1.5663$; $v=56$; Tg=100° C.

Although the invention has been described in considerable detail with particular reference to certain preferred embodiments thereof, variations and modifications can be effected within the spirit and scope of the invention.

We claim:

1. A homopolymer comprising recurring units of a monomer of the general formula:

$$A-(B)_{x-1}-O-\overset{O}{\underset{\|}{C}}-\overset{CH_3}{\underset{\|}{C}}-R$$

wherein $x$ is a positive integer of 1 or 2, —B— is (—CH$_2$—) or (—S—R$^1$—), wherein —R$^1$— is a lower alkylene group; R is hydrogen or methyl; and —A— is a moiety selected from the group consisting of adducts of 2 to 4 moles of a cyclopentadiene, and adducts of 1 to 4 moles of a cyclopentadiene and 1 mole of an α,β-ethylenically unsaturated dienophile, said adducts containing therein an alkylthio group when derived from less than 2 moles of cyclopentadiene.

2. A polymer according to claim 1 wherein said A is a moiety having the structure:

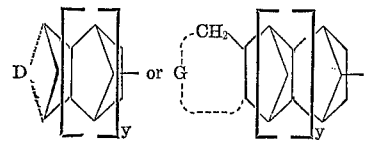

wherein D is vinylene, chloroethylene or alkylthio-substituted ethylene; G is vinylene, ethylene or alkylthio-substituted ethylene; and y is the positive integer 1 to 3.

3. A polymer according to claim 1 comprising recurring units of 2-methacryloyloxyethylmercapto-4,7-methano-5(6)-methylmercaptoperhydroindan.

4. A polymer according to claim 1 comprising recurring units of 5(6)-methacryloyloxyethylmercapto-4,7-methano-2-methylmercaptoperhydroindan.

5. A polymer according to claim 1 comprising recurring units of 5(6)-methylmercapto-3-methylnorborn-2-yl-methyl methacrylate.

6. A homopolymer as set forth in claim 1 wherein A comprises two fused [2.2.1]bicyclic groups.

References Cited
UNITED STATES PATENTS 3,402,153    9/1968    Jaeger    260—78.5
3,427,363    2/1969    Lautenschlager    260—879

JAMES A. SEIDLECK, Primary Examiner

C. A. HENDERSON, Jr., Assistant Examiner

U.S. Cl. X.R.

88—57; 260—89.5 R, 89.5 H, 481 R, 486 R, 486 H